Patented Nov. 3, 1953

2,658,017

UNITED STATES PATENT OFFICE 2,658,017

INSECTICIDAL COMPOSITIONS CONTAINING 1,2-DICHLORO - 4 ($a,B$ - DICHLOROETHYL) - CYCLOHEXANE AND METHOD OF USING THE SAME

Edwin G. Marhofer, Fredonia, Kans., assignor to Phillips Petroleum Company, a corporation of Delaware No Drawing. Application November 26, 1948,
Serial No. 62,217

8 Claims. (Cl. 167—30)

1

This invention relates to insecticides. In some of its specific aspects it relates to new insecticidal toxicants. In other specific embodiments the invention pertains to improved insecticidal solutions of known toxicants which are difficultly soluble or insoluble in liquid hydrocarbons, and to methods of preparing such solutions. The invention in preferred embodiment provides a hydrocarbon solution of 2,2-bis (parachlorophenyl)-1,1,1-trichloroethane (DDT) plus 1,2-dichloro-4-($a,B$-dichloroethyl)-cyclohexane, acting both as a solubilizer for the DDT and as an active insecticidal ingredient.

In marketing operations pertaining to the shipment and storage of 2,2-bis (parachlorophenyl)-1,1,1-trichloroethane, more generally known as DDT, it is highly desirable to ship the DDT, which is the effective insecticide, in solutions of as high concentration as possible. At the locale of application of the DDT as an insecticide, local dilution is easily effected, as by dissolving the concentrated solution in a readily available solvent, or dispersing it with emulsifying agents in water or other cheap and readily available diluents. With prior solvents, of which many are known and practiced in the art, however, it has been found that shipment of high concentrations of, for example, 15 to 35 per cent DDT by weight have been found impractical for use in large scale shipping and marketing operations. Concentrations, for example, of 25 per cent by weight of DDT in solvents used heretofore have been subject to the very serious hazard that at low temperatures encountered in transit or in open warehouses, barns, and other storage localities, the DDT goes out of the solution and settles in the containers. The precipitated DDT does not, with these prior solvents, redissolve or regain its original homogeneity with the solvent upon return to normal temperature. For example, DDT dissolved in benzene is precipitated out at 42° F., which is the freezing point of the solvent, and the solution is, therefore, unstable for further use, even after returning to normal temperatures. When using xylene as the solvent for the DDT, the U. S. Government directions advise that smaller concentrations be used under winter conditions than in the summer time, since xylene dissolves DDT much less effectively at lower temperatures. Alkylated naphthalenes have also been suggested as solvents, but at low temperatures they solidify and precipitate the effective insecticidal ingredient.

Much the same considerations apply to a number of other known insecticides, which have particular value for general or specific application, but which may be referred to as hydrocarbon-insoluble, by which I mean having at least a sufficiently low solubility in the hydrocarbon naphthas commercially used as insecticidal carriers as to require the use of some added solubilizing agent for the preparation of commerically applicable concentrations. Such materials are ordinarily normally solid, and a large number of them are chlorinated compounds. As examples may be mentioned the gamma isomer of hexachlorocyclohexane

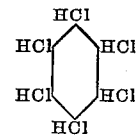

(666), toxaphene (chlorinated camphene), DDD 2,2 - bis(parachlorophenyl) - 1,1 - dichloroethane, methoxy - DDT 2,2 - bis(paramethoxyphenyl) - 1,1,1-trichloroethane, and p-tertiary-amylphenol. A few of the normally liquid materials are likewise more or less insoluble in hydrocarbons, for example the phosphate esters, which are oily but hydrocarbon insoluble.

While, as indicated above, various solubilizing agents for the materials mentioned have heretofore been suggested, each has its own particular drawbacks, and the agents in question generally are merely inert in the system and contribute nothing more than the solubilizing effect. It would of course be desirable to find a good solubilizer which at the same time has insecticidal values of its own.

It is an object of this invention to provide novel toxicants for use in insecticides. It is another object of the invention to solubilize DDT and other hydrocarbon insoluble ingredients, allowing the preparation of hydrocarbon-base insect sprays and like compositions. Another object is to provide a solvent having intrinsic insecticidal properties, capable of carrying in solution a high concentration of another insecticidal substance. A further object of the invention is to provide a solubilizer for known hydrocarbon-insoluble toxicants which contributes its own toxic values to the final insecticidal composition. A further object is to provide components for insecticidal compositions which are readily available from abundant sources of raw materials, and which may be prepared by simple chemical reactions. Yet another object of the invention is to prepare concentrated solutions of DDT suitable for storage and transportation, and which may be diluted with hydrocarbon naphthas at the situs of ultimate use. A still further object is to provide a new composition of matter which has specific toxicity toward household flies and cockroaches. A further object of the invention is to provide improved fumigants. Further objects and advantages of the invention will be apparent to one skilled in the art in view of the accompanying disclosure and discussion.

I have now discovered a new chemical compound, 1,2-dichloro-4-(α,β-dichloroethyl)-cyclohexane, the probable formula of which may be represented in the following manner:

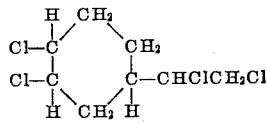

My novel compound has valuable properties for use in the production of insecticides. For example, a five per cent solution of 1,2-dichloro-4-(α,β-dichloroethyl)-cyclohexane in a hydrocarbon solvent gives an excellent knockdown and kill of insect pests, thus providing an effective insecticide when so used. It has excellent stability against deterioration, either in the pure state or in hydrocarbon solutions and can be stored for extended periods of time when so desired.

The compound of my invention may be produced in various ways, for example by dissolving 4-vinyl-1-cyclohexene in chloroform and chlorinating preferably in the absence of light. After removal of the chloroform, the product distills at 235 to 245° F. under a pressure of 0.7 mm. of mercury. It is a light yellow, clear, viscous liquid having an index of refraction of 1.35, molecular weight of 249, shows a chlorine content of 57 per cent and is readily soluble in hydrocarbon solvents.

A particularly significant property of my new product lies in its solvent power for other insecticides such as dichloro-diphenyl-trichloroethane (DDT), hexachlorocyclohexane (benzene hexachloride), and the like. At 77° F. a sample was found to dissolve more than 35 per cent DDT, and a 30 per cent solution of DDT in 1,2-dichloro-4-(α,β-dichloroethyl)-cyclohexane showed no precipitation after 60 hours at a temperature of −12° F.

The corresponding bromo derivative 1,2-dibromo-4-(α,β-dibromoethyl)-cyclohexane, is a crystalline solid and thus is not available as a solvent for the various hydrocarbon-insoluble toxicants mentioned above; however it does have a high insecticidal value, just as 1,2-dichloro-4-(α,β-dichloroethyl)-cyclohexane, and its use as insecticide is accordingly a feature of my invention.

A further advantage of 1,2-dichloro-4-(α,β-dichloroethyl)-cyclohexane lies in its solubilizing effect when employed in the production of solutions of such insecticides as DDT in hydrocarbon solvents which are normally capable of carrying but small concentrations of solute. For example a 10 per cent solution of DDT in a kerosene capable of carrying a concentration of not more than two or three per cent can be prepared by first dissolving the DDT in 1,2-dichloro-4-(α,β-dichloroethyl)-cyclohexane to provide, say a 30 per cent solution, then adding the kerosene until the desired concentration of DDT has been obtained. When operating in this manner no precipitation is observed even after long standing. Thus concentrates of DDT or similar insecticides can be prepared in my compound, transported to the point of use, stored as desired and finally diluted to the desired concentration by the addition of a suitable petroleum solvent. The solubilizing effect of 1,2-dichloro-4-(α,β-dichloroethyl)-cyclohexane as described herein is available with respect to any of the hydrocarbon-insoluble toxicants mentioned herein.

Clearly an important advantage of my invention lies in the fact that a solvent or solubilizer is made available which in addition to desired solubility effects has intrinsic insecticidal value, which is contributed to the final insecticidal spray or other composition, and which in some cases provides specificity toward certain insects not available in the principal toxicant employed.

While my new composition of matter 1,2-dichloro-4-(α,β-dichloroethyl)-cyclohexane, and the corresponding 1,2-dibromo-4-(α,β-dibromoethyl)-cyclohexane may be used as the sole toxicant with diluents in various types of insecticidal compositions such as sprays and dusts, they are also particularly useful as fumigants. While available for fumigating grain and the like, they find a special utility as soil fumigants.

One process for the production of the compositions of this invention comprises dissolving 4-vinyl-1-cyclohexene in chloroform to provide a concentration of about 20 to 30 per cent and passing in chlorine until no further absorption takes place. The chlorination is preferably carried out in the absence of light and proceeds more effectively when the solution is thoroughly agitated by suitable means. Temperatures should be maintained between about 40 and 70° F., preferably between 50 and 60° F. After the chlorination is complete the effluent is washed in a suitable manner to remove residual chlorine, dried and passed to a fractionator where the chloroform is removed under reduced pressure and the product distilled under a pressure which will preferably be below 10 mm. of mercury. Yields obtained when operating in this manner will generally be from 85 to 90 per cent of theory or higher. The bromination may be carried out similarly with elemental bromine. While I have found that efficient yields of high quality product can be obtained by this process, other methods may be used when desired.

The 4-vinyl-1-cyclohexene employed as feed stock may be obtained from any suitable source. I have generally preferred to prepare this material by the dimerization of butadiene according to known methods. By operating in this manner it is possible to produce the compounds of my invention using abundant petroleum starting materials. Vinyl cyclohexene may be obtained either by the deliberate dimerization of 1,3-butadiene at elevated temperatures, or as a by-product of various types of polymerization reactions involving butadiene. Regardless of the method of preparation the material referred to in the specification and claims as 4-vinyl-1-cyclohexene is generally a mixture of isomers, the composition of which has not been accurately determined, but which is believed to be composed principally of the 4-vinyl isomer. It will thus be apparent that the formula 1,2-dichloro-4-(α,β-dichloroethyl)-cyclohexene given herein is to be taken broadly as including not only that specific compound but also the various isomers thereof which may be formed by chlorination of butadiene dimer commercially referred to as vinyl cyclohexene.

The novel toxicants disclosed herein, as well as solutions of other toxicants in same, may be employed in any of the known types of insecticidal compositions. Thus, they may be used per se, they may be employed dissolved in various liquid hydrocarbon solvents or carriers, they may be used with or without added liquid hydrocarbons in aqueous emulsions with the aid of emulsifying agents although there is some tendency to hydrolyze chlorine from the molecule on standing, or dusts may be prepared in which the active material or materials are intimately admixed with finely powdered solids such as clays, talc, gypsum, pyrophilite, and the like. The type of hydrocarbon employed as carrying medium will depend to some extent on the intended use, and will readily be chosen by one skilled in the art. Thus these solvents may range from light lubricating oils employed in tree sprays down the gas oil and kerosene boiling ranges to the gasoline boiling range. A typical kerosene may boil from 325 to 450° F. and have a flash point of 170° F. Specific hydrocarbons such as xylene, or narrow boiling hydrocarbon fractions are useful in particular cases. A narrow boiling odorless isoparaffinic type solvent naphtha known to the trade as "Soltrol 140," boiling from 368 to 403° F., and which has a synergistic effect with many toxicants, is an effective base oil for use with the materials of this invention.

The following examples are offered as illustrative of some of the various aspects of the invention, and of course are not to be construed as limiting the invention in its broad scope.

*Example I*

A solution was prepared by dissolving 108 grams of 4-vinyl-1-cyclohexene in 300 grams of chloroform. This solution was placed in a glass reactor fitted with a mechanical stirrer and shielded from the light. Chlorine gas was passed into the stirred mixture until about 90 grams had been absorbed, the temperature being held between about 50 and 60° F. during the addition. The effluent from the reactor was then washed with water, sodium sulfite solution, and again with water. Chloroform was removed by distillation at reduced pressure after which the product, 1,2-dichloro-4-($\alpha$,B - dichloroethyl) - cyclohexane, was fractioned at 0.7 mm. pressure and in a temperature range of 235 to 246° F. This material was a clear, light yellow, viscous liquid having an agreeable odor. The index of refraction was 1.35, molecular weight 249, chlorine content 57 per cent. The product was completely hydrocarbon soluble.

*Example II*

Five grams of 1,2-dichloro-4-($\alpha$,B-dichloroethyl) - cyclohexane from the experiment of Example I was dissolved in 95 grams of a hydrocarbon solvent (Soltrol 140) and used as a spray on cockroaches. A knockdown of 50 to 60 per cent was observed at the end of 30 minutes. The kill in 24 hours was 90 to 100 per cent. The test procedure was that known as the "settling mist" method. This is a standard test in which the solution is sprayed into a compartment above the one in which the cockroaches are confined; a barrier between the compartments is then withdrawn allowing the mist to settle upon the insects.

*Example III*

The standard Peet-Grady test was employed to evaluate the 1,2-dichloro-4-($\alpha$,B-dichloroethyl)-cyclohexane produced as described in Example I. This test determines the per cent knockdown at 10 minutes and the per cent kill in 24 hours of free flying household flies. The results of the tests were as follows:

| Percent of 1,2-Dichloro-4-($\alpha$, B-dichloroethyl)-cyclohexane in Sotrol 140 | Percent Knockdown, 10 Minutes | Percent Kill, 24 Hours |
|---|---|---|
| 7.5 | 41 | 75 |
| 3.5 | 10 | 15 |
| 1.0 | 4 | 9 |

*Example IV*

A 30 per cent solution of DDT in 1,2-dichloro-4-($\alpha$,B-dichloroethyl)-cyclohexane was maintained at a temperature of —12° F. for 60 hours. No crystallization or precipitation of DDT was noted. A portion of this solution was dissolved in a hydrocarbon solvent (Soltrol 140) to provide a 10 per cent solution. No precipitation of DDT was observed.

I claim:

1. An insecticidal solution comprising an active insecticidal toxicant selected from the group consisting of 2,2-bis(parachlorophenyl)-1,1,1-trichloroethane, the gamma isomer of hexachlorocyclohexane, chlorinated camphene, 2,2-bis(parachlorophenyl) - 1,1 - dichloroethane, p-tertiary-amylphenol, and 2,2-bis(paramethoxyphenyl)-1,1,1-trichloroethane and 1,2-dichloro-4-($\alpha$,B-dichloroethyl) cyclohexane.

2. An insecticidal solution comprising 2,2-bis-(parachlorophenyl)-1,1,1-trichloroethane, a liquid hydrocarbon vehicle, and sufficient 1,2-dichloro-4($\alpha$,B-dichloroethyl-cyclohexane to solubilize the 2,2-bis(parachlorophenyl)-1,1,1-trichloroethane with the 2,2-bis(parachlorophenyl)-1,1,1-trichloroethane being present in an amount up to 30 weight per cent of the 1,2-dichloro-4($\alpha$,B-dichloroethyl)-cyclohexane.

3. An insecticidal composition comprising 1,2 dichloro-4($\alpha$,B-dichloroethyl)-cyclohexane as an active ingredient, and a solid pulverulent insecticide carrier therefor.

4. A methol of killing insect pests which comprises contacting same with lethal quantities of a compound selected from the group consisting of 1,2-dichloro-4($\alpha$,B-dichloroethyl)-cyclohexane and 1,2-dibromo-4($\alpha$,B-dibromoethyl)-cyclohexane.

5. A method of killing insect pests which comprises contacting same with lethal quantities of a mixture of a compound selected from the group consisting of 2,2-bis(parachlorophenyl)-1,1,1-trichloroethane, the gamma isomer of hexachlorocyclohexane, chlorinated camphene, 2,2-bis-(parachlorophenyl) 1,1-dichloroethane, p-tertiary-amylphenol, and 2,2-bis(paramethoxyphenyl)-1,1,1-trichloroethane and 1,2-dichloro-4-($\alpha$,-B-dichloroethyl) cyclohexane.

6. A method of killing insect pests which comprises spraying an affected area containing same with lethal doses of an insecticidal solution comprising 2,2-bis(parachlorophenyl)-1,1,1-trichloroethane, a liquid hydrocarbon vehicle, and sufficient 1,2-dichloro-4($\alpha$,B-dichloroethyl)-cyclohexane to solubilize the 2,2-bis(parachlorophenyl)-1,1,1-trichloroethane with the 2,2-bis(parachlorophenyl)-1,1,1-trichloroethane being present in an amount up to 30 weight per cent of the 1,2-dichloro-4($\alpha$,B-dichloroethyl)-cyclohexane.

7. An insecticidal composition comprising 1,2-dibromo-4($\alpha$,B-dibromoethyl)-cyclohexane and a solid pulverulent insecticide carrier therefor.

8. A solution of 2,2-bis(parachlorophenyl)-1,1,1-trichloroethane in 1,2-dichloro-4(α,B-dichloroethyl)-cyclohexane.

EDWIN G. MARHOFER.

References Cited in the file of this patent

UNITED STATES PATENTS

| Number | Name | Date |
|---|---|---|
| 2,010,841 | Bender | Aug. 13, 1935 |
| 2,448,665 | Fleck et al. | Sept. 7, 1948 |
| 2,518,017 | Johnson et al. | Aug. 8, 1950 |

OTHER REFERENCES

Murat, Chemical Abstracts, volume 3, pages 1276, 1277 (1909).

Beilstein, volume 5, page 14, First Supplement, 1930 ed.